US009601774B2

(12) United States Patent
Courtel et al.

(10) Patent No.: US 9,601,774 B2
(45) Date of Patent: Mar. 21, 2017

(54) USE OF XANTHAN GUM AS AN ANODE BINDER (75) Inventors: Fabrice Courtel, Ottawa (CA); Yaser Abu-Lebdeh, Ottawa (CA)

(73) Assignee: National Research Council of Canada, Ottawa, Ontario (CA)

( * ) Notice: Subject to any disclaimer, the term of this patent is extended or adjusted under 35 U.S.C. 154(b) by 604 days.

(21) Appl. No.: 13/642,929

(22) PCT Filed: Apr. 21, 2011

(86) PCT No.: PCT/CA2011/000450
§ 371 (c)(1),
(2), (4) Date: Oct. 23, 2012

(87) PCT Pub. No.: WO2011/130837
PCT Pub. Date: Oct. 27, 2011

(65) Prior Publication Data
US 2013/0037757 A1    Feb. 14, 2013

Related U.S. Application Data (60) Provisional application No. 61/327,148, filed on Apr. 23, 2010.

(51) Int. Cl.
*H01M 4/62* (2006.01)
*H01M 4/131* (2010.01)
*H01M 10/052* (2010.01)
*H01M 10/0525* (2010.01)

(52) U.S. Cl.
CPC .......... *H01M 4/621* (2013.01); *H01M 4/131* (2013.01); *H01M 4/622* (2013.01); *H01M 4/625* (2013.01); *H01M 10/052* (2013.01); *H01M 10/0525* (2013.01); *Y02E 60/122* (2013.01)

(58) Field of Classification Search
CPC .......... H01M 10/052; H01M 10/0525; H01M 4/131; H01M 4/621; H01M 4/622; H01M 4/625
See application file for complete search history.

(56) References Cited

U.S. PATENT DOCUMENTS

| 7,479,133 B2 | 1/2009 | Sun et al. |
| 7,491,467 B2 | 2/2009 | Satoh et al. |
| 2005/0004550 A1 | 1/2005 | Sun et al. |
| 2005/0010192 A1 | 1/2005 | Sun et al. |
| 2005/0015042 A1 | 1/2005 | Sun et al. |
| 2005/0148996 A1 | 7/2005 | Sun et al. |
| 2005/0191550 A1 | 9/2005 | Satoh et al. |
| 2006/0253078 A1 | 11/2006 | Wu et al. |
| 2007/0060862 A1 | 3/2007 | Sun et al. |
| 2007/0287064 A1 | 12/2007 | Suzuki et al. |
| 2008/0032192 A1 | 2/2008 | Yokomizo et al. |
| 2009/0112283 A1 | 4/2009 | Kriksunov et al. |
| 2009/0117473 A1 | 5/2009 | Satoh et al. |
| 2009/0293262 A1 | 12/2009 | Shimamune |
| 2010/0092864 A1 | 4/2010 | Yokomizo et al. |
| 2010/0209773 A1 | 8/2010 | Sakashita et al. |

FOREIGN PATENT DOCUMENTS

| JP | 2001357852 | 12/2001 |
| JP | 2002184408 | 6/2002 |
| JP | 2004214182 | 7/2004 |
| JP | 2006107780 | 4/2006 |
| JP | 200742285 | 2/2007 |
| JP | 2007234277 | 9/2007 |
| JP | 2007273355 | 10/2007 |
| JP | 2009170287 | 7/2009 |
| WO | 2006008930 | 1/2006 |
| WO | 2008020620 | 2/2008 |

OTHER PUBLICATIONS

English abstract of JP 08-0888002; "Hydrogen Storage Alloy Electrode and Manufacture Thereof", published Feb. 4, 1996, Shin Etsu Chem Co Ltd.
English abstract of WO 2006/008930; "Negative Electrode Material for Lithium Secondary Battery, Method for Producing Same, Negative Electrode for Lithium Secondary Battery Using Same and Lithium Secondary Battery", published Jan. 26, 2006, Mitsubishi Chem. Corp.
English abstract of WO 2008/020620; "Negative Electrode Active Material for Lithium Ion Secondary Battery, Method for Producing the Same, Negative Electrode for Lithium Ion Secondary Battery Using the Same, and Lithium Ion Secondary Battery", published Feb. 21, 2008, Mitsubishi Chem. Corp.
Beattie et al., "Si Electrodes for Li-Ion Batteries—A New Way to Look at an Old Problem", J. of the Electrochemical Society, vol. 155(2), p. A158-A163, 2008.
Buqa et al., "Study of Styrene Butadiene Rubber and Sodium Methyl Cellulose as Binder for Negative Electrodes in Lithium-ion Batteries", J. of Power Sources, vol. 161, p. 617-622, 2006.
Courtel et al., "Water-soluble Binders for MCMB Carbon Anodes for Lithium-Ion Batteries", J. of Power Sources, vol. 196, p. 2128-2134, 2011.
Du Pasquier et al., "Differential Scanning Calorimetry Study of the Reactivity of Carbon Anodes in Plastic Li-Ion Batteries", J. Electrochem. Soc., vol. 145(2), p. 472-477, 1998.
Gaberscek et al., "Improved Carbon Anode for Lithium Batteries Pretreatment of Carbon Particles in a Polyelectrolyte Solution", Electrochem. And Solid-State Letters, vol. 3(4), p. 171-173, 2000.
Hochgatterer et al., "Silicon/Graphite Composite Electrodes for High-Capacity Anodes: Influence of Binder Chemistry on Cycling Stability", Electrochem. and Solid-State Letters, vol. 11(5), p. A76-A80, 2008.
Kaloustian et al., "Analyse Thermique de la Cellulose et de Quelques Derives Etherifies et Esterifies", J. of Thermal Analysis, vol. 48, p. 791-804, 1997.

(Continued)

*Primary Examiner* — Carlos Barcena
(74) *Attorney, Agent, or Firm* — Catherine Lemay (57) ABSTRACT Xanthan gum has been found to be a superior binder for binding an electrode, especially an anode, in a lithium-ion or lithium-sulfur battery, being able to accommodate large volume changes and providing stable capacities in batteries tested with different types of anode materials.

12 Claims, 7 Drawing Sheets (56) References Cited

OTHER PUBLICATIONS

Li et al., "Sodium Carboxymethyl Cellulose: A Potential Binder for Si Negative Electrodes for Li-Ion Batteries", Electrochem. and Solid-State Letters, vol. 10(2), p. A17-A20, 2007.
Liu et al., "Enhanced Cycle Life of Si Anode for Li-Ion Batteries by Using Modified Elastomeric Binder", Electrochem. and Solid-State Letters, vol. 8(2), p. A100-A103, 2005.
Lux et al., "Low Cost, Environmentally Benign Binders for Lithium-Ion Batteries", J. of the Electrochem. Society, vol. 157(3), p. A320-A325, 2010.
Machado et al., "Carboxymethylcellulose Derivatives with Low Hydrophilic Properties", Polimery, vol. 48(4), p. 273-279, 2003.
Maleki et al., "Thermal Stability Studies of Binder Materials in Anodes for Lithium-Ion Batteries", J. of the Electrochem. Maleki Society, vol. 147(12), p. 4470-4475, 2000.
Maleki et al., "Thermal Stability Studies of Li-Ion Cells and Components", J. of the Electrochem. Society, vol. 146(9), p. 3224-3229, 1999.
Ohta et al., "A Novel Binder for the Graphite Anode of Rechargeable Lithium Ion Batteries for the Improvement of Reversible Capacity", Carbon, vol. 39, p. 1421-1446, 2001.
Oksam et al., "Sol-Gel Synthesis of Carbon/Silica Gel Electrodes for Lithium Intercalation", Electrochem. and Solid-State Letters, vol. 2(12), p. 610-612, 1999.
Verbrugge et al., "Electrochemcial Analysis of Lithiated Graphite Anodes", J. of the Electrochem. Society, vol. 150(3), p. A374-A387, 2003.
Zhang et al., "Study of Poly(acrylonitrile-methyl methacrylate) as binder for graphite anode and LiMn2O4 Cathode of Li-ion Batteries", J. of Power Sources, vol. 109, p. 422-426, 2002.
English Abstract of JP 2004214182.
English Abstract of JP 2006107780.
English Abstract of JP 2002184408.
English Abstract of JP 2009170287.
English Abstract of JP 2007234277.
English Abstract of JP 200742285.
English translation of Office Action dated Jun. 4, 2014 for corresponding Chinese Application No. 201180025348.0.
Chinese Office Action dated Jun. 4, 2014 for corresponding Chinese Application No. 201180025348.0.
English translation of Japanese Office Action dated Aug. 19, 2014 for corresponding Japanese Application No. P2013-505288.
English translation of Japanese Final Office Action dated Mar. 24, 2015 for corresponding Japanese Application No. P2013-505288.
Extended European Search Report dated Apr. 22, 2015 for EP Application No. 11771442.8.
English Abstract of JP 2001357852A.
English Abstract of JP2007273355A.
English translation of Office Action dated Mar. 31, 2015 for corresponding Chinese Application No. 201180025348.0.
Chinese Office Action dated Mar. 31, 2015 for corresponding Chinese Application No. 201180025348.0.
Chinese Office Action dated Dec. 4, 2015 for corresponding Chinese Application No. 201180025348.0.
Chinese Office Action dated Aug. 3, 2016 for corresponding Chinese Application No. 201180025348.0.

USE OF XANTHAN GUM AS AN ANODE BINDER

CROSS-REFERENCE TO RELATED APPLICATIONS

This application is a national phase entry of International Patent Application PCT/CA2011/000450 filed Apr. 21, 2011 and claims the benefit of U.S. Provisional Patent Application Ser. No. 61/327,148 filed Apr. 23, 2010, the entire contents of both of which are herein incorporated by reference.

FIELD OF THE INVENTION

This invention relates to electrode binders, particularly anode binders in lithium-ion or lithium-sulfur batteries.

BACKGROUND OF THE INVENTION

In lithium-ion batteries cathodes typically comprise a lithium-containing material and the anode is usually a lithium-free material such as graphite, a metal, a metalloid, or an oxide. In lithium-sulfur batteries, the anode is typically lithium metal and the cathode is made of sulfur or a carbon/sulfur composite. New lithium-sulfur battery devices use a metal/carbon composite as an anode and a polysulfide cathode (e.g. $Li_2S$). In lithium ion batteries, the anode may be: i) a metal or a metalloid that can alloy with lithium, mainly elements form groups: 2B (Zn and Cd), 3A (Al, Ga and In), 4A (Si, Sn and Pb), 5A (Sb and Bi) and Sn-alloys (Sn—Fe, Sn—Co, Sn—Ni, Sn—Cu, Sn—Zn); ii) hard or soft carbon (e.g. graphite), iii) an oxide whose metal allows with lithium such as $SnO_2$, $Sb_2O_3$, and silicon oxide); iv) a transition metal oxide ($Li_4Ti_5O_{12}$, titanium oxide, chromium oxide, manganese oxide, iron oxide, cobalt oxide, nickel oxide, copper oxide and zinc oxide). Lithium also intercalates into nitrides, phosphides and sulfides. In lithium-ion batteries, of particular importance are anodes in which lithium is intercalated into an oxide or an oxide-carbon matrix.

Tin oxide reacts with lithium according to the following reaction:

$SnO_2 + 4Li^+ + 4e^- \rightarrow Sn + 2Li_2O$ irreversible reaction (711 mAh/g)

$Sn + 4.4Li^+ + 4.4e^- \rightarrow SnLi_{4.4}$ reversible reaction (783 mAh/g)

Anodes that comprise metal (or a carbon/metal composite or metal oxide) that alloys with lithium suffer from large volume change upon lithiation/delithiation of the electrode during operation and re-charging of the battery. This volume expansion ranges from about 100% for Al to about 300% for Si. In order to accommodate this large volume change it is necessary either to use nanoparticles or use a binder that can accommodate this volume change. Polyvinylidene fluoride (PVDF) is the conventionally used binder in battery technology; however, it does not accommodate a volume change larger than about 15-20%, such as for graphite or $Li_4Ti_6O_{12}$. PVDF does not get reduced at low potential (5 mV versus Li/Li$^+$) nor oxidized at high potential (5 V versus Li/Li$^+$) at room temperature. However, at elevated temperature, it has been reported that PVDF reacts with Li metal and $LiC_6$ to form LiF and some C=CF species via an exothermic reaction which will cause a risk for thermal runaway (Du Pasquier 1998; Maleki 1999; Maleki 2000). To avoid this risk, research has focused on the use of non-fluorinated binders (Gaberscek 2000; Oskam 1999; Ohta 2001; Zhang 2002; Verbrugge 2003). Even though they are still insoluble in water, reduced heat was obtained when phenol-formaldehyde, poly(vinylchloride) or polyacrylonitrile are used as binders (Maleki 2000; Du Pasquier 1998). Another disadvantage of using PVDF is its price which is about US $20 per kg in North America (€15-18 per kg in Europe (Lux 2010)). In addition, PVDF requires the use of non-environmentally friendly solvents to process the electrode formation, such as N-methyl-2-pyrrolidone (NMP). Also, it is not easy to dispose of PVDF at the end of the battery life (Lux 2003). Thus more environmentally friendly binders are needed for preparing electrode materials for Li-ion batteries.

Some rubber-based binders such as styrene-butadiene rubber have been tested with some success, but these binders are not water soluble and there is a further need to improve their ability to accommodate volume expansion. Sodium carboxymethylcellulose (NaCMC) is a sugar-based molecule used as a thickener in the food industry and has shown good accommodation of volume expansion in the case of silicon-based electrodes (Li 2007; Buqa 2006; Beattie 2008; Hochgatterer 2008; Liu 2005), and more recently with tin oxide-based electrodes (Chou 2010). In addition to being able to accommodate the volume change, NaCMC is water soluble due to the carboxymethyl groups attached to the cellulose. This avoids the use of non-environmentally friendly solvents during the casting process, which makes fabrication of the electrode easier. As mentioned by Lux et al., the use of NaCMC also makes the recycling of Li-ion battery anodes easier (Lux 2010). Indeed, by heating NaCMC at 700° C., $Na_2CO_3$ is obtained. In addition (Machado 2003; Kaloustian 1997), the price of NaCMC is much lower than PVDF, about US $6 per kg in North America (€1-2 per kg in Europe (Lux 2010)).

One approach in the prior art (Satoh 2005; Satoh 2008; Satoh 2009a; Satoh 2009b) for producing negative electrodes for batteries has been to use graphite-based anodes and binders having olefinic unsaturated bonds (e.g. styrene-butadiene rubbers). In such an approach, the graphite-based anode may be coated with metal oxides. This prior art also suggests that xanthan gum may be used as a co-binder along with the binder having olefinic unsaturated bonds. However, there has been no specific exemplification of the use of xanthan gum and the use of xanthan gum exclusively, i.e. not as a co-binder, has not been suggested. Further, the anode material is restricted to graphite or graphite coated on the surface with metal oxides. Such anode materials do not experience the very large volume expansions that oxide or oxide-carbon matrix materials undergo during the lithiation/delithiation process.

There remains a need in the art for water soluble binders which can accommodate large volume expansions upon lithiation/delithiation of electrodes in lithium-ion or lithium-sulfur batteries.

SUMMARY OF THE INVENTION

It has now been surprisingly found that xanthan gum is an excellent water-soluble binder for anodes in lithium-ion and lithium-sulfur batteries, accommodating large volume changes and providing stable capacities in batteries tested with different types of anode materials.

Thus, there is provided a use of a binder consisting essentially of xanthan gum for binding an electrode in a lithium-ion or lithium-sulfur battery.

There is further provided a use of xanthan gum as a binder for an electrode consisting essentially of lithium intercalated into an oxide or lithium intercalated into a homogeneous matrix of an oxide and a conductive carbon.

There is further provided an anode for a lithium-ion or lithium-sulfur battery comprising a lithium-containing material bound by a binder consisting essentially of xanthan gum.

There is further provided an anode for a lithium-ion battery comprising a xanthan gum-bound electrode comprising a lithium-containing material consisting essentially of lithium intercalated into an oxide or lithium intercalated into a homogeneous matrix of oxide and a conductive carbon.

For general use in lithium-sulfur and lithium-ion batteries, the anode binder consists essentially of xanthan gum, where no co-binder is present. In lithium-sulfur batteries, the lithium-containing material of the anode is Li—S. In lithium-ion batteries, anodes may comprise a lithium-containing material, for example, a lithium alloy, lithium intercalated into a conductive carbon (e.g. graphite, carbon black, mesoporous carbon microbeads, carbon nanotubes, graphene and mixtures thereof), lithium intercalated into an oxide (e.g. aluminum oxide, tin oxide, silicon oxide, cobalt oxide, iron oxide, titanium oxide, copper oxide and mixtures thereof), lithium intercalated into a nitride, lithium intercalated into a phosphide, or lithium intercalated into silicon, or lithium inserted into a compound or composite by displacement. Lithium intercalated into a conductive carbon, lithium intercalated into an oxide or lithium intercalated into a homogeneous matrix of oxide and conductive carbon are preferred lithium-containing materials. Of the oxides, metal oxides are of particular note, more particularly transition metal oxides. Transition metal oxides include, for example, chromium oxides, manganese oxides, iron oxides, cobalt oxides, nickel oxides, copper oxides and zinc oxides. Tin oxide or silicon oxide is preferred. Mixed metal oxides, for example $ZnMn_2O_4$ may be used.

Of particular importance are anodes which consist essentially of lithium intercalated into an oxide or an oxide-carbon matrix. The oxide-carbon matrix is composite having a substantially homogeneous matrix of carbon in the oxide or an oxide in the carbon. Preferred oxides and conductive carbons are described previously. The oxide:carbon ratio (w/w) is preferably in a range of from 99:1 to 1:99, more preferably 90:10 to 10:90, most preferably 89:11 to 11:89. The oxide is preferably provided in the form of nanoparticles, forming a nanocomposite with the carbon. In this particular application, the binder containing xanthan gum may further comprise a co-binder, for example, polyvinylidene fluoride, sodium carboxymethylcellulose, styrene-butadiene rubber or mixtures thereof. Preferably, the co-binder is present in the binder in an amount of less than about 75 wt % of the weight of the binder, more preferably less than about 50 wt %, even more preferably less than about 25 wt %. Most preferably, the binder does not contain a co-binder and consists essentially of xanthan gum.

Also of importance are anodes comprising alloy composites incorporating at least one element (metal or metalloid) that can alloy with lithium (e.g. Zn, Cd, Pt, Al, Ga, In, Si, Ge, Sn, Pb, Sb, Bi), or a conductive carbon as discussed earlier or a second element (preferably a metal) that does not alloy with lithium (e.g. Co or Ti). The use of xanthan gum helps accommodate large volume expansion (100-400%) associated with the alloying process that leads to bad battery performance. Sn, Si and Sn/Co/C alloy are of particular note.

Xanthan gum is a polysaccharide derived from the bacterial coat of Xanthomonas campestris. Xanthan gum is prepared by inoculating Xanthomonas campestris bacterium with a sterile aqueous solution of carbohydrate (e.g. glucose, sucrose, lactose or mixtures thereof), a source of nitrogen, dipotassium phosphate, and some trace elements. The medium is well-aerated and stirred, and the polymer is produced extracellularly into the medium. The final concentration of xanthan produced will vary greatly depending on the method of production, strain of bacteria, and random variation. After fermentation that can vary in time from one to four days, the xanthan polymer is precipitated from the medium by the addition of isopropyl alcohol and dried and milled to give a powder that is readily soluble in water or brine to form a gum. The degree of carboxylation of xanthan gum can affect its performance as an electrode binder. Typically, a higher degree of carboxylation will confer better battery performance. The degree of carboxyation of the xanthan gum may be readily controlled by carboxylation or de-carboxylation reactions to achieve the desired performance characteristics. Preferably, the degree of carboxylation is in a range of from about 0.5 to about 1.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DESCRIPTION OF PREFERRED EMBODIMENTS

Cyclic voltammetry and cell cycling were carried out on half cells using 2325-type coin cells assembled in an argon-filled glove box. Cyclic voltammograms were recorded using a BioLogic™ VMP3 potentiostat/galvanostat. The potential of the working electrode was swept at 0.1 mV s$^{-1}$ from open-circuit potential down to 5 mV (or 10 mV) versus Li/Li$^+$, then swept up to 1.5 V (or 2 V or 3 V) versus Li/Li$^+$; afterwards cells were cycled between 1.5 V (or 2 V or 3 V) and 5 mV (or 10 mV) versus Li/Li$^+$. Capacity measurements were performed by galvanostatic experiments carried out on a multichannel Arbin battery cycler. The working electrode was first charged down to 5 mV (or 10 mV) versus Li/Li$^+$ at different C-rates and then discharged up to 1.5 V (or 2 V or 3 V) versus Li/Li$^+$. The mass of active material used in the calculation is the mass of the material used in the active electrode.

Working electrodes were prepared as follows. Active material (e.g. carbon graphite (MCMB), nano-SnO$_2$/C, Sn—Co, ZnMn$_2$O$_4$ or Si) was mixed with 5 wt % of Super carbon (Timcal) and 5 or 10 wt % of binder. Electrode films were made by spreading the material onto a high purity copper foil current collector (cleaned using a 2.5% HCl solution in order to remove the copper oxide layer) using an automated doctor-blade and then dried overnight at 85° C. in a convection oven. Individual disk electrodes (Ø=12.5 mm) were punched out, dried at 80° C. under vacuum overnight and then pressed under a pressure of 0.5 metric ton. A lithium metal disk (Ø=16.5 mm) was used as a negative electrode (counter electrode and reference electrode). 70 µL of a solution of 1 M LiPF$_6$ in ethylene carbonate/dimethyl carbonate (1:1, v/v) was used as electrolyte and spread over a double layer of microporous propylene separators (Celgard™ 2500, 30 µm thick, Ø=2.1 mm). The cells were assembled in an argon-filled dry glove box at room temperature.

Figure 1:
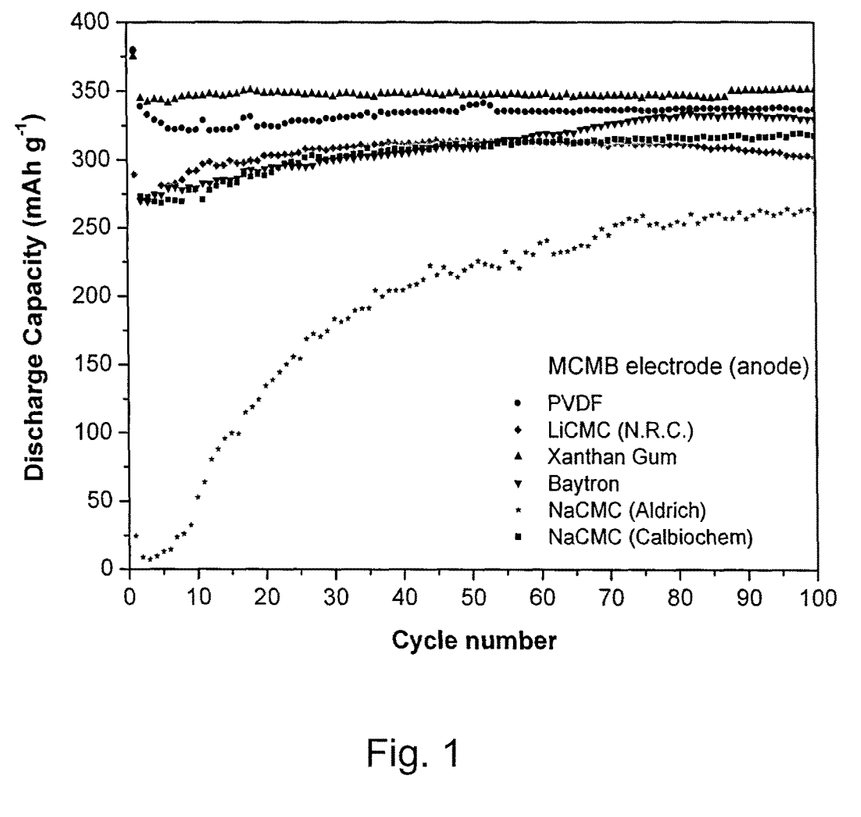
FIG. 1 depicts a graph showing cycling behavior of half batteries made of a lithium reference and counter electrode and a meso carbon microbead (MCMB) anode. Anodes were prepared using five different binders: polyvinylidene fluoride (PVDF), sodium carboxymethylcellulose (NaCMC) from two different sources, lithium carboxymethylcellulose (LiCMC), Baytron™ (a compound of poly-3,4-ethylenedioxythiophene and polystyrenesulfonic acid) and xanthan gum. The electrodes were cycled between 5 mV and 1.5 V versus $Li/Li^+$ at C/12 (complete charge and discharge in 24 h).
Figure 2:
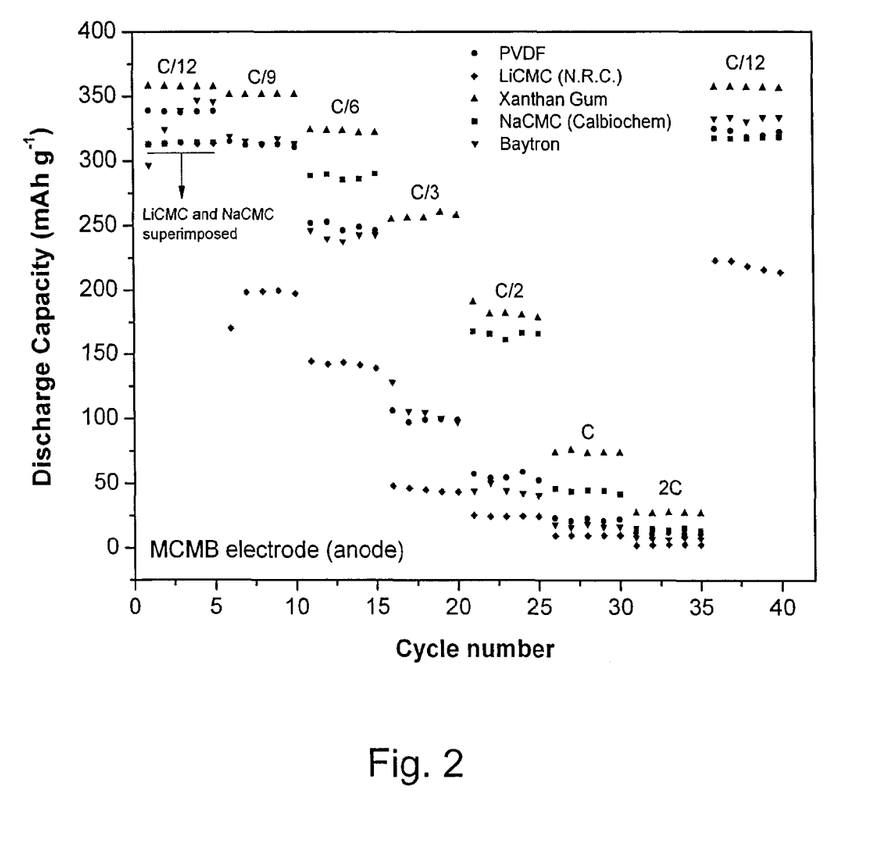
FIG. 2 depicts a graph showing cycling behavior of half batteries made of a lithium reference and counter electrode and a meso carbon microbead (MCMB) anode. Anodes were prepared using five different binders: polyvinylidene fluoride (PVDF), sodium carboxymethylcellulose (NaCMC), lithium carboxymethylcellulose (LiCMC), Baytron™ (a compound of poly-3,4-ethylenedioxythiophene and polystyrenesulfonic acid) and xanthan gum. The electrodes were cycled between 5 mV and 1.5 V versus $Li/Li^+$ at different C-rates (C/12, C/9, C/6, C/3, C/2, C and 2C).
Figure 3:
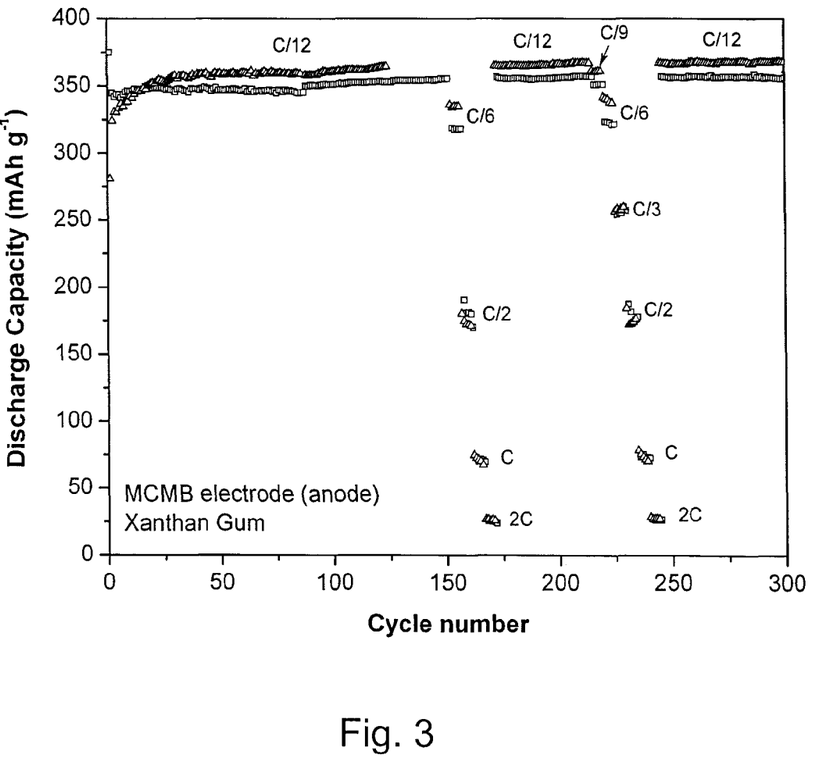
FIG. 3 depicts a graph showing a long term cycling behavior of half batteries made of a lithium reference and counter electrode and a meso carbon microbead (MCMB) anode. Anodes were prepared using xanthan gum. The electrodes were cycled between 5 mV and 1.5 V versus $Li/Li^+$ at different C-rates.

Referring to FIG. 1, it is evident that for half batteries comprising meso carbon microbead (MCMB) anodes, the use of xanthan gum as the anode binder leads to significantly higher and more stable discharge capacity over 100 charging cycles than all of the use of any of the other binders, including PVDF. Referring to FIG. 2, it is evident that this result is consistent across a broad range of C-rates.

Figure 4:
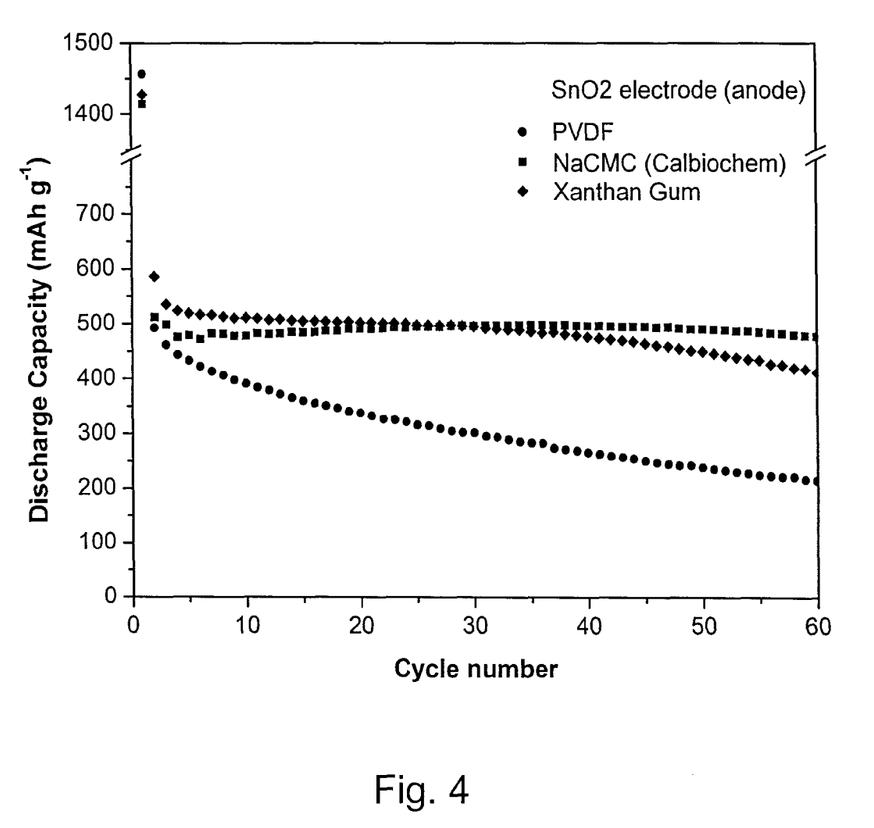
FIG. 4 depicts a graph showing cycling behavior of half batteries made of a lithium reference and counter electrode and an anode of a composite material (nano-$SnO_2$/C 78%-22% in weight %). Anodes were prepared using three different binders: polyvinylidene fluoride (PVDF), sodium carboxymethylcellulose (NaCMC), and xanthan gum. The electrodes were cycled between 0.1 V and 1 V versus $Li/Li^+$ at C/12 (complete charge and discharge in 24 h).

For half batteries comprising nano-SnO$_2$/C anodes, the use of xanthan gum as the anode binder leads to significantly higher and more stable discharge capacity over tens of charging cycles than with the use of PVDF, and the use of xanthan gum is comparable to the use of NaCMC (see FIG. 4).

Figure 5:
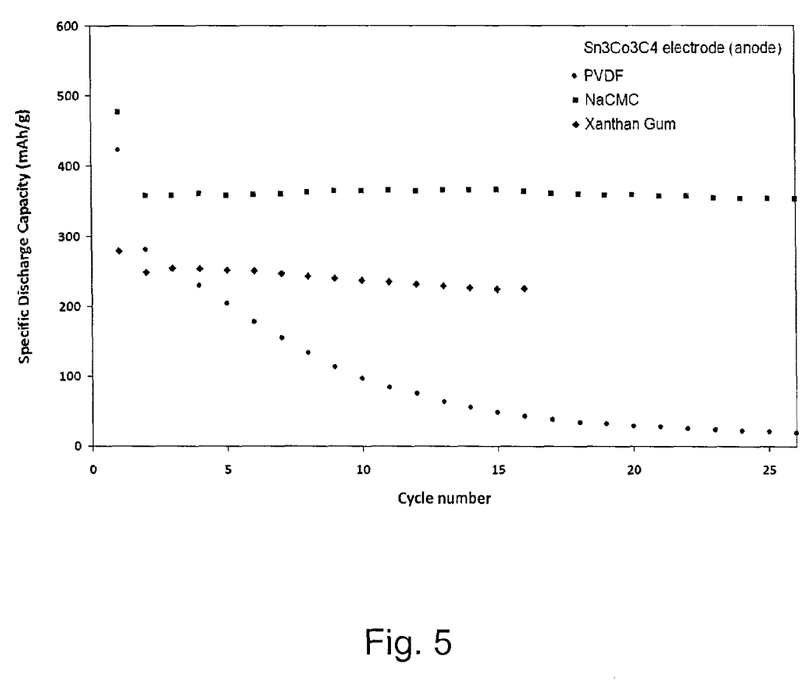
FIG. 5 depicts a graph showing cycling behavior of half batteries made of a lithium reference and counter electrode and a Sn—Co anode. Anodes were prepared using three different binders: polyvinylidene fluoride (PVDF), sodium carboxymethylcellulose (NaCMC), and xanthan gum. The electrodes were cycled between 5 mV and 1.5 V versus Li/Li$^+$ at C/12.

For half batteries comprising Sn—Co anodes, the use of xanthan gum as the anode binder leads to significantly higher and more stable discharge capacity over tens of charging cycles than with the use of PVDF, albeit a somewhat lower discharge capacity than with the use of NaCMC (see FIG. 5).

Figure 6:
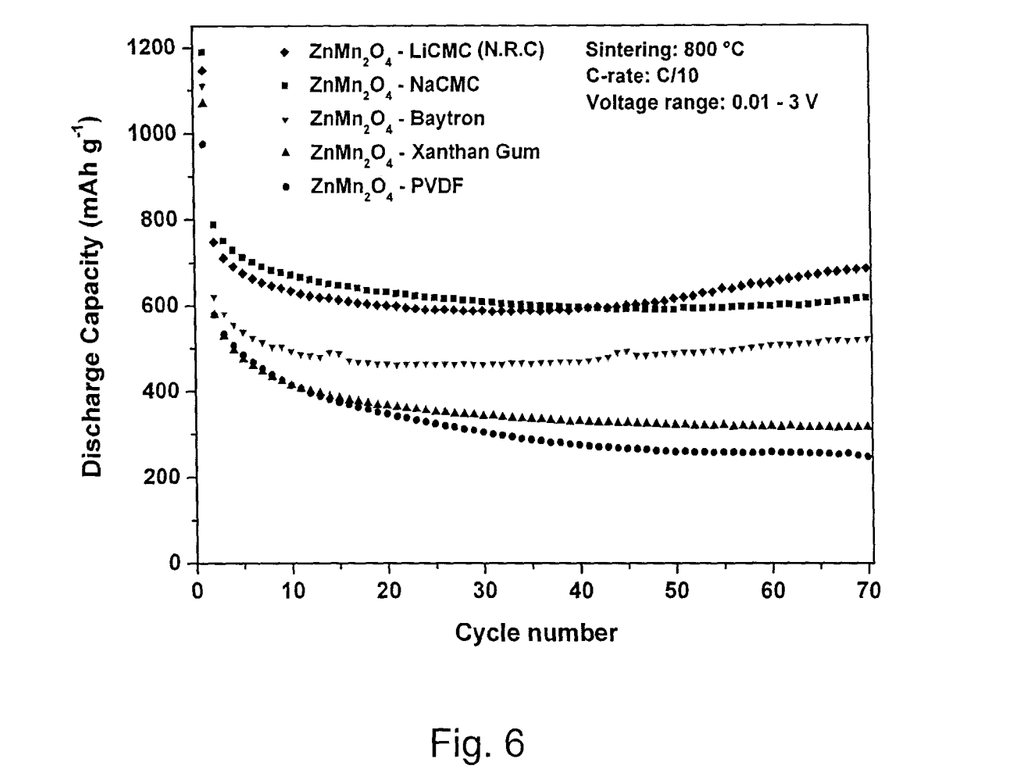
FIG. 6 depicts a graph showing cycling behavior of half batteries made of a lithium reference and counter electrode and an anode of a sintered mixed metal oxide (ZnMn$_2$O$_4$ spinel). Anodes were prepared using five different binders: lithium carboxymethylcellulose (LiCMC), sodium carboxymethylcellulose (NaCMC), Baytron™ (a compound of poly-3,4-ethylenedioxythiophene and polystyrenesulfonic acid), xanthan gum and polyvinylidene fluoride (PVDF). The electrodes were cycled between 10 mV and 3 V versus Li/Li$^+$ at C/10 (complete charge and discharge in 20 h).

For half batteries comprising ZnMn$_2$O$_4$ spinel anodes, the use of xanthan gum as the anode binder leads to higher and more stable discharge capacity over tens of charging cycles than with the use of PVDF, although the use of xanthan gum led to somewhat lower discharge capacity than the use of LiCMC or NaCMC (see FIG. 6).

Figure 7:
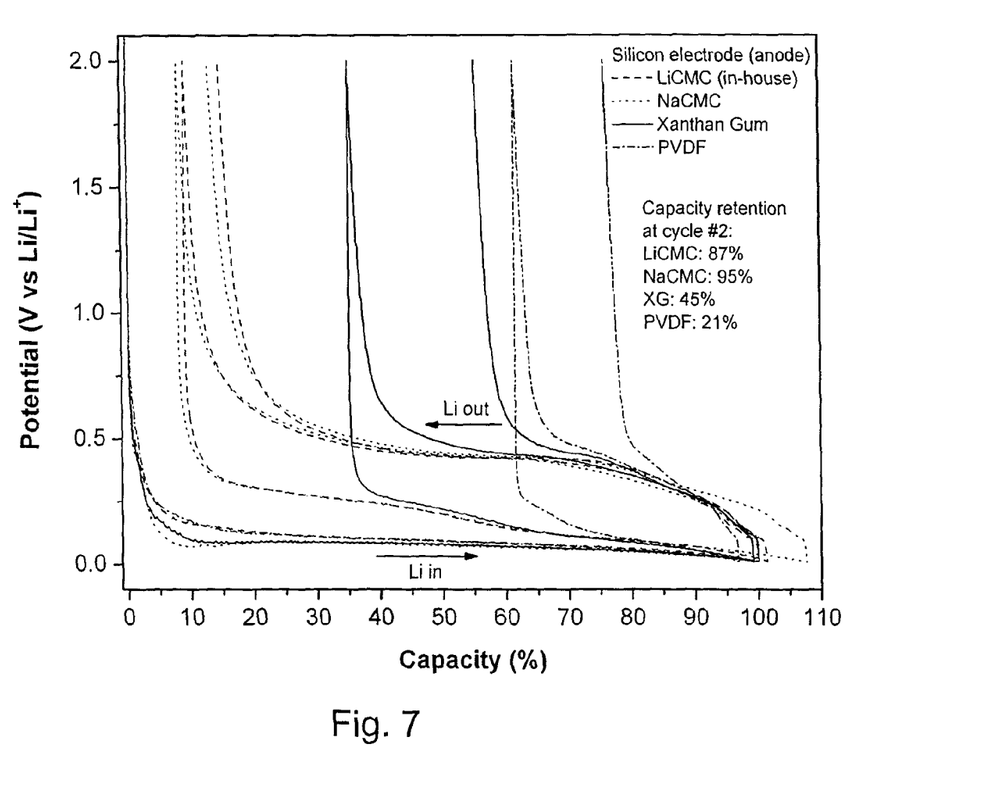
FIG. 7 depicts a graph showing long term cycling behavior of half batteries made of a lithium reference and counter electrode and a silicon anode. Anodes were prepared using lithium carboxymethylcellulose (LiCMC), sodium carboxymethylcellulose (NaCMC), xanthan gum and polyvinylidene fluoride (PVDF). The electrodes were cycled between 5 mV and 2.0 V versus Li/Li$^+$.

For half batteries comprising silicon anodes, the use of xanthan gum as the anode binder leads to higher discharge capacity retention at cycle #2 than PVDF (45% vs. 21%) but lower discharge capacity retention than either LiCMC (87%) or NaCMC (95%) (see FIG. 7).

Results demonstrate that the use of xanthan gum as an anode binder provides higher and more stable discharge capacity than polyvinylidene fluoride over a broad range of anode materials, while in some cases being comparable to carboxymethylcellulose.

REFERENCES

The contents of the entirety of each of which are incorporated by this reference.

Beattie S D, Larcher D, Morcrette M, Simon B, Tarascon J M. (2008) *J. Electrochem. Soc.* 155: A158-A163.
Buqa H, Holzapfel M, Krumeich F, Veit C, Novák P. (2006) *J. Power Sources.* 161: 617-622.
Chou S-L, Wang J-Z, Zhong C, Rahman M M, Liu H-K, Dou S-X. (2010) *Electrochim. Acta.* In Press, Accepted Manuscript.
Du Pasquier A, Disma F, Bowmer T, Gozdz A S, Amatucci G, Tarascon J M. (1998) *J. Electrochem. Soc.* 145: 472-477.
Gaberscek M, Bele M, Drofenik J, Dominko R, Pejovnik S. (2000) Electrochem. *Solid-State Lett.* 3: 171-173.
Hochgatterer N S, Schweiger M R, Koller S, Raimann P R, Wohrle T, Wurm C, Winter M. (2008) *Electrochem. Solid-State Lett.* 11: A76-A80.
Kaloustian J, Pauli A M, Pastor J. (1997) *J. Therm. Anal. calorim.* 48: 791-804.
Li J, Lewis R B, Dahn J R. (2007) *Electrochem. Solid-State Lett.* 10, A17.
Liu W R, Yang M-H, Wu H-C, Chiao S M, Wu N-L. (2005) *Electrochem. Solid-State Lett.* 8: A100-A103.
Lux S F, Schappacher F, Balducci A, Passerini S, Winter M. (2010) *J. Electrochem. Soc.* 157: A320-A325.
Machado G D O, Regiani A M, Pawlicka A. (2003) *Polimery.* 48: 273-279.
Maleki H, Deng G, Anani A, Howard J. (1999) *J. Electrochem. Soc.* 146: 3224-3229.
Maleki H, Deng G, Kerzhner-Haller I, Anani A, Howard J N. (2000) *J. Electrochem. Soc.* 147: 4470-4475.
Ohta N, Sogabe T, Kuroda K. (2001) *Carbon.* 39: 1434-1436.
Oskam G, Searson P C, Jow T R. (1999) *Electrochem. Solid-State Lett.* 2: 610-612.

Satoh H, Yokomizo M, Ishihara T. (2005) United States Patent Publication 2005-0191550 published Sep. 1, 2005.

Satoh H, Yokomizo M, Ishihara T. (2008) United States Patent Publication 2008-0032192 published Feb. 7, 2008.

Satoh H, Yokomizo M, Ishihara T. (2009a) United States Patent Publication 2009-0117473 published May 7, 2009.

Satoh H, Yokomizo M, Ishihara T. (2009b) U.S. Pat. No. 7,491,467 issued Feb. 17, 2009.

Shimamune T. (2009) United States Patent Publication 2009-0293262 published Dec. 3, 2009.

Suzuki K, Mashita K. (2007) United States Patent Publication 2007-0287064 published Dec. 13, 2007.

Verbrugge M W, Koch B J. (2003) *J. Electrochem. Soc.* 150: A374-A384.

Yokomizo M, Satou H, Kamada T, Sanada T. (2006) Abstract of International Patent Publication WO 2006-008930 published Jan. 26, 2006.

Yokomizo M, Satou H, Kamada T. (2008) Abstract of International Patent Publication WO 2008-020620 published Feb. 21, 2008.

Zhang S S, Jow T R. (2002) *J. Power Sources.* 109: 422-426.

Other advantages that are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. An electrode in a lithium-ion or lithium-sulfur battery bound by a binder, wherein the binder consists of xanthan gum.

2. The electrode according to claim 1, wherein the electrode comprises Li—S, a lithium alloy, lithium intercalated into a conductive carbon, lithium intercalated into an oxide, lithium intercalated into a nitride, lithium intercalated into a phosphide or lithium intercalated into silicon.

3. The electrode according to claim 1, wherein the electrode comprises lithium intercalated into a metal oxide.

4. The electrode according to claim 1, wherein the electrode comprises lithium intercalated into an aluminum oxide, tin oxide, silicon oxide, cobalt oxide, iron oxide, titanium oxide, copper oxide or mixtures thereof.

5. The electrode according to claim 1, wherein the electrode comprises lithium intercalated into a mixed metal oxide.

6. The electrode according to claim 1, wherein the electrode comprises lithium intercalated into a homogeneous matrix of an oxide and a conductive carbon.

7. The electrode of claim 6, wherein the conductive carbon comprises graphite.

8. The electrode of claim 6, wherein the oxide is a metal oxide.

9. The electrode according to claim 6, wherein the oxide is aluminum oxide, tin oxide, silicon oxide, cobalt oxide, iron oxide, titanium oxide, copper oxide or mixtures thereof.

10. The electrode according to claim 6, wherein the oxide is tin oxide or silicon oxide.

11. The electrode according to claim 6, wherein the electrode is an anode.

12. The electrode according to claim 1, wherein the electrode is an anode.

\* \* \* \* \*